(12) United States Patent
Burak et al.

(10) Patent No.: US 8,277,315 B2
(45) Date of Patent: Oct. 2, 2012

(54) GAME SIMULATION BASED ON CURRENT EVENTS

(75) Inventors: Asi Burak, Pittsburgh, PA (US); Eric W. Brown, Pittsburgh, PA (US); Eric Keylor, Columbiana, OH (US); Victoria Webb, Longmont, CO (US); Wang-Ling Lin, Sunnyvale, CA (US); Tim Sweeney, Meza, AZ (US); Ross Popoff, Cambridge, MA (US)

(73) Assignee: Hybrid Learning Systems, Inc., Pittsburgh, PA (US)

(*) Notice: Subject to any disclaimer, the term of this patent is extended or adjusted under 35 U.S.C. 154(b) by 810 days.

(21) Appl. No.: 11/680,937

(22) Filed: Mar. 1, 2007

(65) Prior Publication Data

US 2007/0207846 A1    Sep. 6, 2007

Related U.S. Application Data

(60) Provisional application No. 60/777,910, filed on Mar. 1, 2006.

(51) Int. Cl.
*A63F 9/24* (2006.01)

(52) U.S. Cl. ........... 463/30; 463/31; 463/32; 463/33

(58) Field of Classification Search ......... 463/16–20, 463/42, 30–33
See application file for complete search history.

(56) References Cited

U.S. PATENT DOCUMENTS

| | | | |
|---|---|---|---|
| 6,450,887 B1* | 9/2002 | Mir et al. | 463/42 |
| 6,508,709 B1* | 1/2003 | Karmarkar | 463/42 |
| 6,758,754 B1 | 7/2004 | Lavanchy et al. | |
| 6,860,806 B2* | 3/2005 | Kojima et al. | 463/6 |
| 6,918,769 B2 | 7/2005 | Rink | |
| 7,155,158 B1 | 12/2006 | Iuppa et al. | |
| 2003/0171140 A1* | 9/2003 | Gatto et al. | 463/6 |
| 2004/0005918 A1* | 1/2004 | Walker et al. | 463/16 |
| 2004/0048642 A1* | 3/2004 | Kinzer et al. | 463/1 |
| 2007/0117637 A1* | 5/2007 | Morgan et al. | 463/43 |

OTHER PUBLICATIONS

Kuma War, http://kumawar.com/downloads.php, Feb. 24, 2007, pp. 1-5.
America's Army, http://www.americasarmy.com/intel/features.php, Feb. 24, 2007, pp. 1-8.

\* cited by examiner

*Primary Examiner* — Peter DungBa Vo
*Assistant Examiner* — Steve Rowland
(74) *Attorney, Agent, or Firm* — Barbara E. Johnson, Esq.

(57) ABSTRACT

A video game includes: (i) a graphic user interface that presents a user a simulation of real-life events; (ii) a content database containing a collection of actual photos and videos of real-life events; (iii) a simulation engine that, presents a plurality of possible actions to the user, receives a selection of at least one of the actions from the user, identifies at least one photo or video in the database that is associated with the user-selected action, and presents the user with a result in response to the selection, wherein the result includes the identified photo or video; (iv) a content update module that receives updated photo or video content from one or more content distributors, creates an association element for the updated content and an available action in the game, and includes the updated content and association element in the content database; and (v) a scoring module.

6 Claims, 10 Drawing Sheets

GAME SIMULATION BASED ON CURRENT EVENTS

RELATED APPLICATIONS AND CLAIM OF PRIORITY

This application claims priority to co-pending U.S. provisional patent application No. 60/777,910, filed Mar. 1, 2006 entitled "Game Simulation and Technological Platform for Conflict Resolution."

BACKGROUND

1. Technical Field

The disclosed embodiments generally relate to the field of simulation software such as, for example, video game simulation software, interactive news simulation software, etc. More particularly, the disclosed embodiments relate to a software platform, designed in a computer/video game format, to simulate strategies and disciplines of using real-life events such as modern-day conflict resolution.

2. Description of the Related Art

Video games and computer simulations are a revolutionary medium for entertainment and education and the technology of a new generation. According to published statistics as of early 2006 roughly 60% of Americans reported that they play video games, and 65% of college students were regular or occasional game players. The video game industry grossed over $10 billion in the US during 2005. Video games are interactive, immersive and experiential. They transport players to new places and allow them to explore, experiment and learn at their on pace.

Despite its unquestionable success with introducing groundbreaking technology to the masses, the commercial video game industry has received a lot of negative publicity in the media. The public criticism, whether justified or not, is focused at the shallow, violent and sexually explicit content that has become prevalent in the market today. This criticism has come from the U.S. government, institutions, parents and gamers alike. It has created a growing demand and interest in a different kind of video games—"Serious Games"—that deal with meaningful subject matter and teach more positive lessons.

The serious game market is one of the fastest growing sectors within the video game industry. It includes a variety of products that range from professional business training applications and military training simulations to mass distribution educational tutorial content. Furthermore, many organizations have realized the potential of using video games to reach young adults and convey serious social or political agendas.

A current example is "America's Army", a highly successful multiplayer training simulation that is owned by the U.S. government and distributed as a global public relations initiative to help with U.S. Army recruitment. Another American private company, Kuma Reality Games, re-creates real-world conflicts in video game format using information culled from news accounts, military experts, US Department of Defense records and original research. Ache KumaWar website allows the player to download and participate in virtual military missions, which are just days or weeks old.

Both examples (America's Army and KumaWar) deal with the technological aspects of war and combat ("how we fight"), rather than their moral aspects ("why we fight"). They train the player in strategic and tactical army disciplines, resolving violent conflicts through conquest and military domination. In addition, they are one-sided in their content presentation. Thus, the success of these games drove developers in the Arab world to create ideological counterparts, such as Underash (a Syrian studio) or Hezbollah's "Special Force". They present similar design concepts and gameplay, with the conflicting sides inverted.

The disclosure contained herein describes attempts to address the genuine need in alternative educational, professional and recreational software tools dealing with real-world conflicts.

SUMMARY

In an embodiment, a video game includes: (i) a graphic user interface that presents a user a simulation of real-life events; (ii) a content database containing a collection of actual photos and videos of real-life events; (iii) a simulation engine that, presents a plurality of possible actions to the user, receives a selection of at least one of the actions from the user, identifies at least one photo or video in the database that is associated with the user-selected action, and presents the user with a result in response to the selection, wherein the result includes the identified photo or video; (iv) a content update module that receives updated photo or video content from one or more content distributors, creates an association element for the updated content and an available action in the game, and includes the updated content and association element in the content database; and (v) a scoring module.

Optionally, the result also includes a simulated event. Optionally, the real-life events comprise events arising from a conflict between two or more entities, and the simulation engine also requires the user select a side or position in the conflict. Before presenting the plurality of possible actions, the game may present an inciting event to the user, such that the actions include responses to the inciting event, wherein the result relates to both the selected action and the inciting event. Optionally, the presentation of an inciting event may include the display of a photo or video from the database. Also optionally, the receipt of updated content by the content update module occurs automatically from a subscription-based feed such as a real-world news source. The creation of an association element may include analyzing updated content, and associating a tag, metadata, or index file with the updated content update to allow the simulation engine to select updated content from the content database for inclusion in an appropriate portion of a game. The score may he indicative of a compromise or conflict resolution associated with the result. The scoring module may calculate a plurality of scores, wherein each score reflects different real or virtual player's reaction to the user-selected action.

In an alternate embodiment, a method of providing a video game with a simulation of a real-life event, includes a computer program module that instructs a computing device to: (i) present an inciting event to a player; (ii) present a plurality of possible actions to the player; (iii) receive, from the player a selection of a user-selected action from at least one of the actions; (iv) access a content database to retrieve at least one photo or video that is associated with the user-selected action and the inciting event; (v) present, to the user, a result in response to the user-selected action, wherein the result includes the identified photo or video; (vi) obtain updated content from one or more content distributors; (vii) create an association element that relates the updated content to an available action in the game; and (viii) include the updated content and association element in the content database. The result also may include a simulated event. The real-life events may include events arising from a conflict between two or more entities, and the computer program module also require the player select a side or position in the conflict. The association element also relates the updated content to an available inciting event in the game. The presenting an inciting event may include the display of a photo or video from the database. The receipt of updated content by the content update module may occur automatically from a subscription-based feed. The creation of an association element may include analyzing updated content, and associating a tag, metadata, or index file with the updated content update to allow the simulation engine to select updated content from the content database for inclusion in an appropriate portion of a game. The method also may include generating a plurality of scores, wherein each score reflects a different real or virtual player's reaction to the user-selected action.

In an alternate embodiment, a method of providing a video game simulation of a real-life event includes a computer program module that instructs a computing device to maintain a content database of photos and videos of real-life events, receive a user-selected action, access the content database to retrieve at least one photo or video that is associated with the user-selected action, and present the with a result in response to the user-selected action, wherein the result includes the identified photo or video. The method also obtains updated content from one or more content distributors, creates an association element that relates the updated content to an available action in the game, includes the updated content and association element in the content database; and generates a plurality of scores, wherein each score reflects a different real or virtual player's reaction to the user-selected action.

DETAILED DESCRIPTION

Before the present methods, systems and materials are described, it is to be ;understood that this disclosure is not limited to the particular methodologies, systems and materials described, as these may vary. It is also to be understood that the terminology used in the description is for the purpose of describing the particular versions or embodiments only, and is not intended to limit the scope.

It must also be noted that as used herein and in the appended claims, the singular forms "a," "an," and "the" include plural references unless the context clearly dictates otherwise. Unless defined otherwise, all technical and scientific terms used herein have the same meanings as commonly understood by one of ordinary skill in the art. Although any methods, materials, and devices similar or equivalent to those described herein can be used in the practice or testing of embodiments, the preferred methods, materials, and devices are now described. All publications mentioned herein are incorporated by reference. Nothing herein is to be construed as an admission that the embodiments described herein are not entitled to antedate such disclosure by virtue of prior invention. As used herein, the word "comprising" means "including but not limited to."

Figure 1:
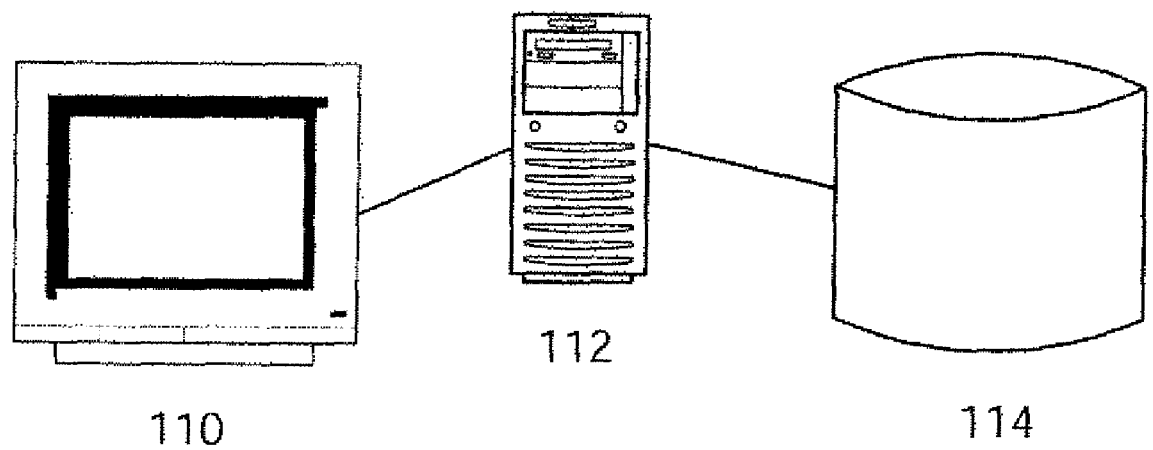
FIG. 1 illustrates exemplary elements of a gaming platform.

Referring to FIG. 1, In an embodiment, a gaming platform includes at least three elements: a graphic interface 110 over an advanced logical and artificial intelligence (AI) engine 112, supported by a content database 114 (i.e., a digital library of text, images, video and/or sound). The technological architecture can be used to create simulations about any historical or current event. As used herein, the phrase "current event" may be used to include any historic or current events based on real-life occurrences. In some embodiments, the event may include a conflict, such as a conflict between nations, a conflict between tribes or ethnic groups, or any other conflict between distinct groups of people, e.g. the Israeli-Palestinian conflict, the U.S. vs. Islamic fundamentalism, or the Indian-Pakistani struggle over Kashmir. Different conflicts or other events may be represented by changing the digital assets that comprise the graphic interface (such as maps, flags and text box content) and changing the digital library of text, images and videos. In some embodiments, such changes do not require a change in the underlying code. When creating a new game for a different current event, different variables may be selected to create a plausible model for the conflict in question.

Content Database and Update Module

The gaming platforms described herein may provide an unbiased, multi-layered game simulation of real-world events, such as a conflict that engages the player in seeking non-violent solutions and compromise. Unlike most existing computer works, which rely on 3-D or 2-D graphical presentation, the present gaming platform also contains a digital library of real-world news photographs and video footage. Those may be imported or otherwise obtained from available media (including, but not limited to, newspapers, TV stations, wire services, online news sources), and are interjected into the simulation to present information, and more importantly illustrate the "real-world" consequences to the user's actions. This connects the user to current events, outside of the virtual environment of the simulation. The use of such materials may be very powerful in confronting the user with moral and emotional issues that are usually neglected in other interactive applications.

Figure 2:
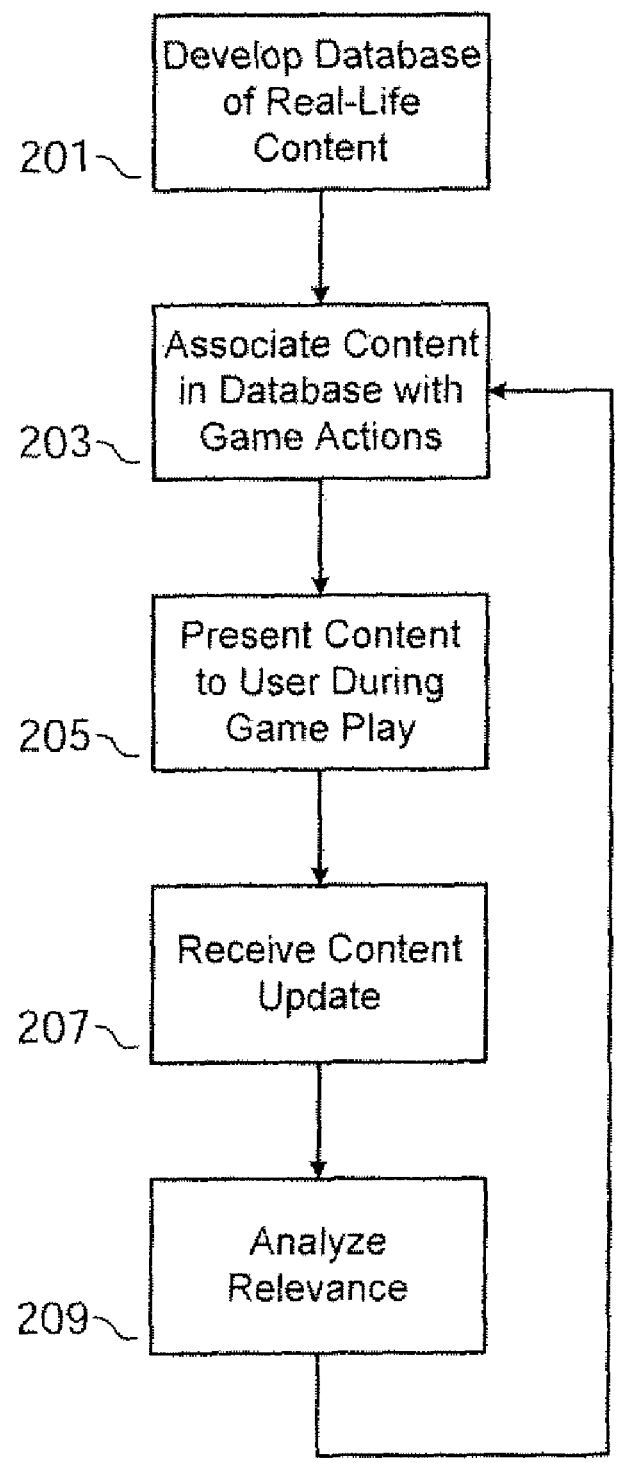
FIG. 2 is a flow diagram of an exemplary content updating process.

The gaming systems described herein may be played online, with the gaming software residing on one or more central servers so that players use a browser or other thin client to play the game. In an alternative embodiment, users may download the gaming software and play the game using the user's local computing device. In either situation, a central server may provide the user with content updates using a method such as that shown in FIG. 2. Referring to FIG. 2 a gaming system provider may develop a database of real-life content 201, which includes photos and/or videos of current events taken from news media or other sources. According to various embodiments, the real-life content 201 may also comprise audio and/or text. The system provider associates 203 the real-life content with one or more game actions so that when the game is played, relevant real-life photos and/or videos may be presented to the player to show the player a consequence that the player takes in the gaming environment. The presentation of real-life photos to the player 205 may be done by the central server when an online version of the game is played. Alternatively, in downloadable versions the association may be done before the software is downloaded so that the selection of real-life content for presentation is done by the downloaded software on the user's computing device based on the association, On a periodic basis, the gaming system receives content updates 207 and includes them in the database of real-life content. The content updates may replace and/or supplement the existing content in the database. The content updates may he analyzed for relevance 209 and associated with game actions based on relevance 203. The updated content may be presented to the user during game play 205.

In some embodiments, the content updates may be received from an external source on a subscription basis. For example, in online versions of the gaming system, the central server may subscribe to a news or other media service that provides photos and/or videos of current events. The gaming system operator may automatically or manually analyze the relevance of the photos and/or videos to the game 209, and if so, the operator will include them in the database of content for that game. In downloadable versions of the game, the player may subscribe to a content update service and receive content updates via email or automatic subscription-bases feeds, such as RSS, ATOM, or other web feeds. The central server may perform the actions shown in FIG. 2 by determining relevance of the content and associating it with one or more game actions before sending the updated content to the user.

The gaming platform may be implemented through a computer program written in any suitable computing language. For example, the platform may be written in any programming language which can be compatible with Windows, Macintosh or Linux systems. In one embodiment, the platform may operate on any computer system with the following minimum requirements: 486 or higher processor; Microsoft Windows 95/98/2000/XP/NT/Vista, 64 MB Ram; 100 megabytes disk space.

Flow of Interaction

Figure 3:
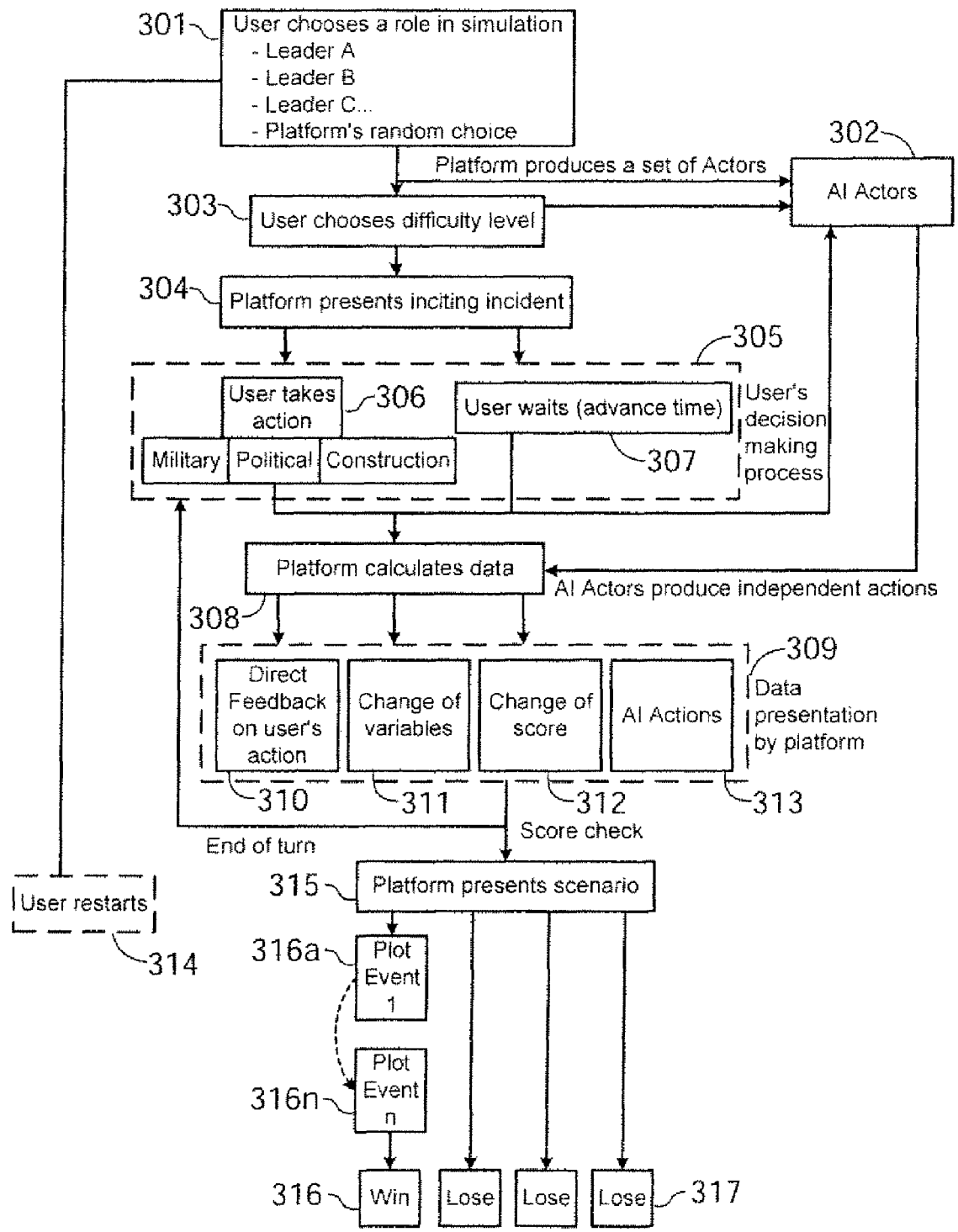
FIG. 3 depicts a flow diagram of exemplary interaction with a gaming platform.

A user of the gaming platform described herein may include a game player or any other person who accesses and uses the gaming platform. In accordance with one embodiment, as illustrated in FIG. 3, the user may choose a role to play in the simulation 301. The role may include one a side in the conflict. In addition, the user might choose to play one of the leaders, or let the simulation make a random choice for him. Once a role is defined, the platform produces a set of actors and actions 302. The user may choose a difficulty level (e.g. "Calm", "Tense", "Violent") 303, and the platform updates the artificial intelligence system behind the actors' virtual behavior. A higher difficulty level may produce more violent actions and resistance on behalf of the avatars or artificial intelligence actors. In some embodiments, the user also may be presented the option to select a language for use in game play.

As a first or early step, the platform presents an inciting incident, such as a real-world news event with text, sound and/or embedded video 304. In embodiments that include conflict simulation, the inciting incident may serve as a trigger and entry point to educate the user about the violent environment. The simulation forces the user to confront an extreme situation that affects his agenda and all other social and political groups and leaders.

Then, a turn in the simulation begins, and the platform waits for input from the user. The user may have available to him information about groups and leaders, significant geographic locations, abstract variables and/or a virtual advisor to aid in his or her decision making process 305.

Figure 4:
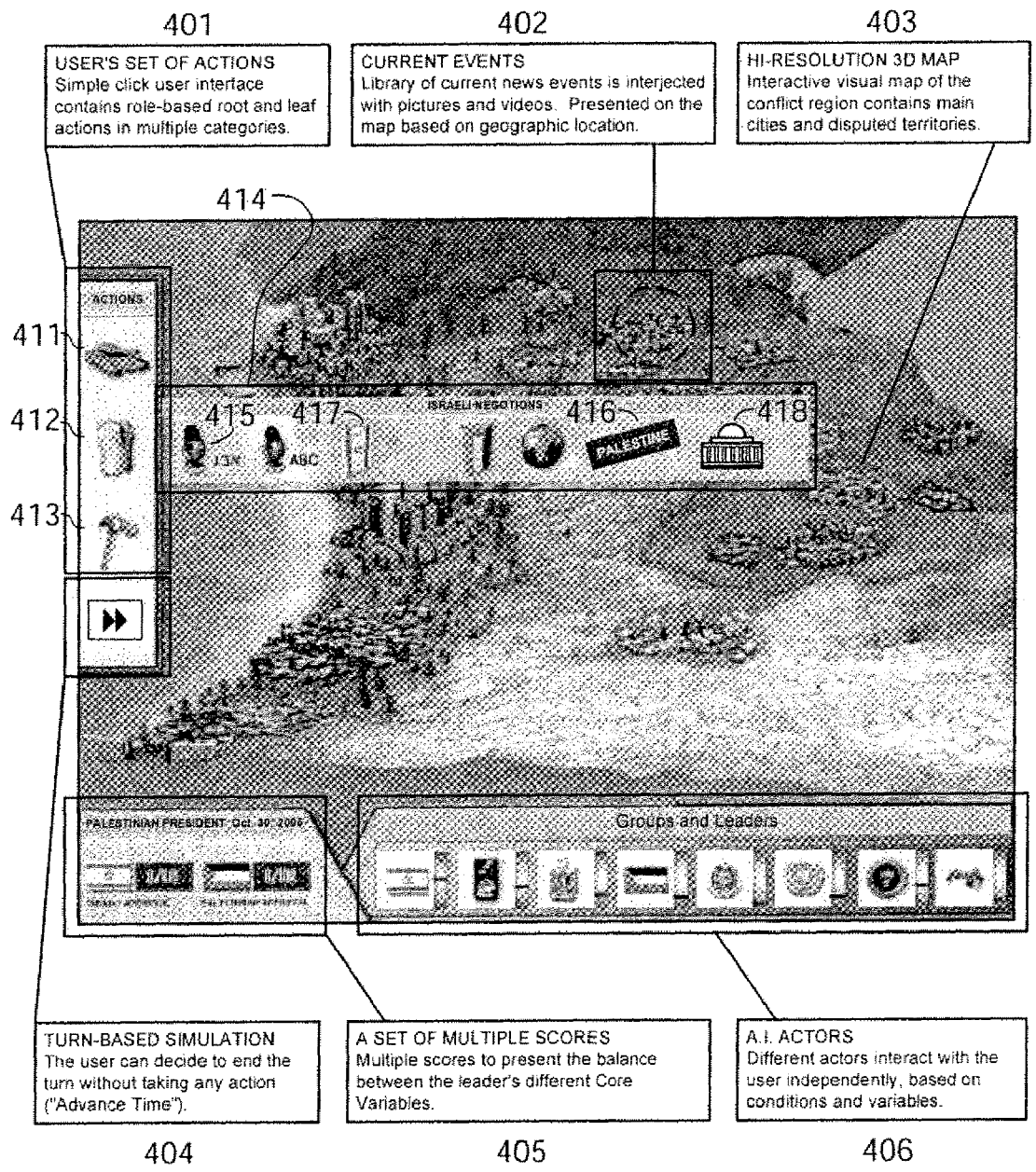
FIG. 4 is a screenshot of an exemplary graphic user interface (GUI) showing exemplary gaming elements.

The platform presents a set of possible actions 306 or the option to wait a turn 307, all accessible through the graphical interface. For example, referring to FIG. 4, in a conflict simulation embodiment the user may select an action involving military force 411, diplomacy or negotiation 412, or physical construction or reconstruction 413, or the user may select no action 404. If the user selects one of the options 401, such as diplomacy, one or more sub-options 414 may be available, such as reaching out to the other side with statements through domestic or foreign pres 415, direct negotiations 416, negotiations with one or more factions 417, or contact through a third party mediator 418. Optionally, as shown in FIG. 4, the options may be presented in graphic format using icons. Alternatively, or in addition to the icons, the options may be presented via a text description in the graphic user interface.

Returning to FIG. 3, once the user makes a decision, the input may be processed by the platform's core engine. The system produces and/or identifies actions, based on the world's variables and timely conditions or other criteria, and optionally also based on the user's actions. The platform gathers the user's actions and the game-implemented actions and may make calculations 308 that are used to determine a score or other action. The result, score or action is presented to the user as output 309 (see also FIG. 5).

The output 309 may include elements such as events 310, which are direct feedback to the user's actions, and which may also be generated based on other variables such as previous actions, AI actor's actions, time elapsed or other factors. The events 310 may indicate if the user succeeded in his intention, failed or whether the end result is sub-optimal and partial. In some embodiments, the events include real-life content taken from the current events content that is available to the system. Then, the platform may randomly or purposefully change some or all variables 311 and generate a score 312 as a result of the user's success or failure and how it was perceived by all parties. The platform also may present actions of other avatars or simulated participants 313. These can result in an additional change in variables and score. With that, the turn may end. Unless a plot point or a win/lose state was reached, and if the user does not choose to end the play, a new turn may begin. Turns may be considered to be a virtual presentation of time, and in one embodiment of the invention each turn presents one day. Other time periods, such as a block of hours, a week, or another time frame is possible.

Every new turn may require the user to participate in a decision making process 305 based on the new conditions, and the related feedback from the system 309. That cycle ends only when a win/lose state is reached or if the user chooses to end or restart the simulation 314, In such a case, the user may return to the start to choose his role 301, and some or all variables and conditions may be reset.

If a win or lose state is reached, the platform may present an ending scenario 315. It could be a win scenario 316, which means that the user has reached a peaceful solution, or improved the environment dramatically during his term in office. A lose scenario 317 relies on the score and the deficits of the user's policies. It may indicate, for example, a very negative result in relation to internal authority and as a result, the outbreak of a civil war. A very negative result on external authority may indicate other scenarios, such as losing the support of the world community and all external sources of funding. The results may be determined based on known data about real-world actions, so that a determination of a result may be based on what policies or actions precedent similar results in the real world. The results may be presented using text, photos, videos, and/or audio presentation from actual, real-world events.

In some versions of the invention, several plot events 316a ... 316n are presented to the user on the way to a win/lose state. The platform may present those events to indicate positive or negative progress and build a convincing scenario around it. Plot events may be presented at key points, based on the conditions in the world and the score. A plot event may be designed and presented by the platform in a way that is unique and defers it from any other feedback event. The plot events may be based on real-world actions, so that a determination of an event may be based on what policies or actions precedent similar events in the real world. The plot events may be presented using text, photos, videos, and/or audio presentation from actual, real-world events.

In some embodiments a two-player simulation or multi-player simulation may be available. For example instead of using a computer-implemented virtual actor, some embodiments may include two players on opposing sides. In such an embodiment, the players may face external difficulties to achieving peace such as dissenting factions, religious tensions, or adverse environmental or economic conditions. In addition, multiplayer simulations may permit two or more players to assume different roles on a single side of a conflict (such as a military leader and a government leader), and those players may face a virtual actor or other real-life players.

Scoring and Core Balance of Interaction

Figure 5:
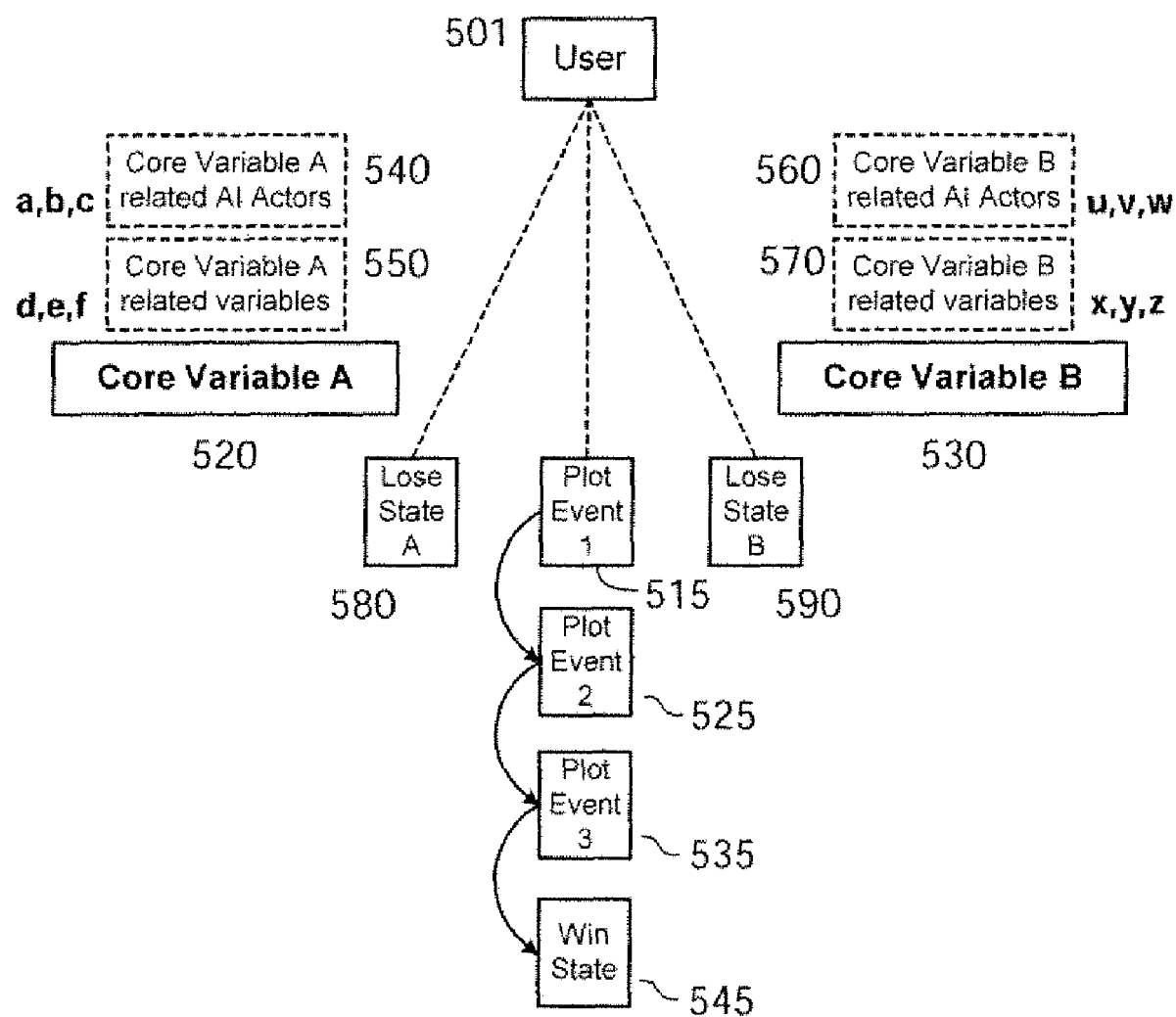
FIG. 5 depicts a diagram of an exemplary scoring method for a gaming system.

FIG. 5 illustrates in more detail exemplary calculation of score and ending scenarios. The triangle presents the core balance of the simulation. The user 501 needs to achieve balance and stability among numerous variables and virtual actors in order to achieve a score that equals or exceeds a winning threshold. Many of those are presented to the user in the form of graphical feedback, such as the real-life photos and videos of current events, but some of those are hidden and kept in the core engine. One model for such a core balance (as depicted here) is between Core Variable A 520 and Core Variable B 530, where each of those variables contains its own set of sub-variables and AI actors.

Core Variable A may calculate components to contribute to the user's score based on reaction of virtual actors 540 to the user's actions. In a conflict resolution simulation, the virtual actors may represent the wide public, coalition groups, opposition groups or other social groups. Added to that are internal variables 550, which in a conflict resolution simulation may indicate the morale of the population or how it perceives its leader. In some versions, the sum of the calculation is presented to the user in the form of a "Core Variable A" score that ranges between 100 to −100.

In the same way, Core Variable B may be calculated. It could, for example, include all external AI actors 560, usually foreign groups, institutions or communities. It may also include external variables 570 such as the level of cooperation with other external forces and their willingness to fund or support the leader. In some versions the sum of the calculation is presented as a "Core Variable B" Score (range: 100 to −100).

A challenge in winning a conflict resolution simulation and achieving a peaceful resolution to the conflict is to figure a way to make positive progress on both ends. The user finds out that most of his or her actions have contradicting results, that is, they improve one side of the equation but not the other. Some may have more extreme results, and they also may include some levels of randomness. Unbalanced gameplay may result in a negative progress on one end and lead to a losing state. Losing state A 580 and losing state B 590 are both a direct result of an unbalanced policy.

In a conflict resolution simulation, a key to achieving a balance and creating genuine progress on both ends, may be for the player to choose actions that impact the long-term variables. Such a change gives momentum to the leader, and creates conditions in which his future actions are better accepted. In some versions such a long-term variable would be the sympathy of the leader's population to the other sides in the conflict. At the beginning of the simulation, that variable may have a very low value. Thus, violent actions taken by the leader may be supported by his population. However, building trust with the other leaders, achieving concessions and advancing negotiations may change that variable over time to reach a tipping point. As a result, the leader may follow a bolder policy and receive support for more peaceful agendi, improving both Core Variables at the same time.

A winning policy leads to a win state 545. It may indicate the end to the conflict, or a more modest scenario of a temporary treaty between the conflicting sides, with the support of other parties. Plot events 515, 525, 535 may be interjected into gameplay and lead to a win state 545.

The Technological Platform—Engine, Interface and Digital Library

Figure 6:
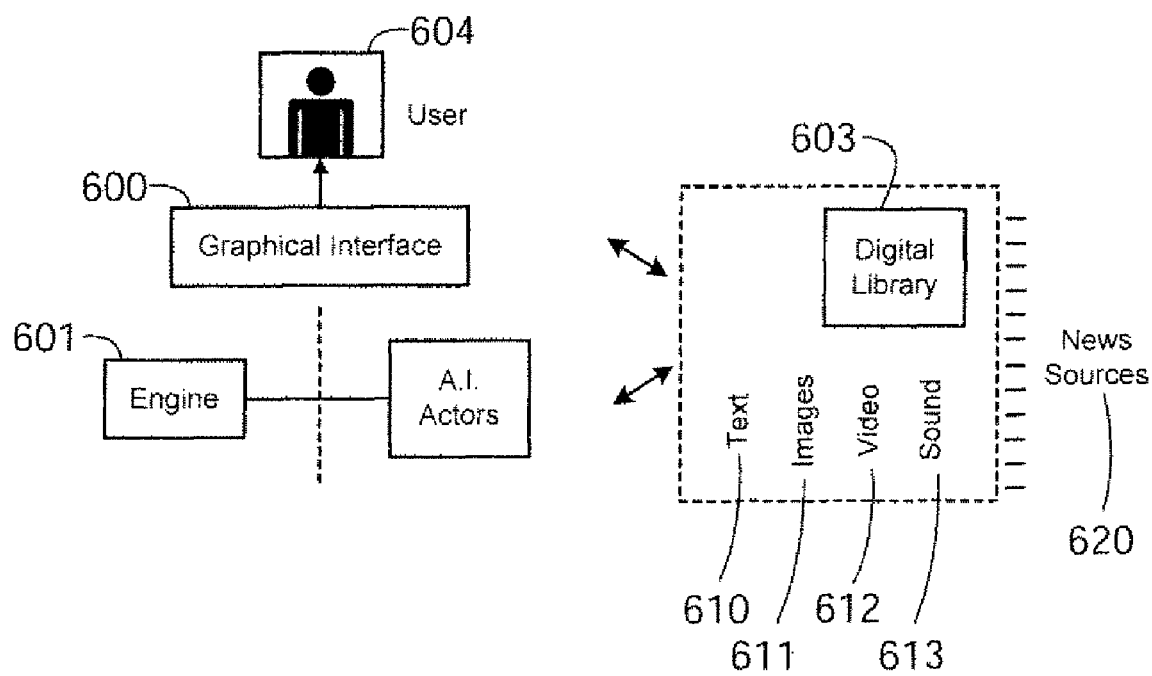
FIG. 6 depicts a block diagram of a technological platform architecture.

FIG. 6 depicts a diagram of exemplary technological components of a gaming platform and how it can be used to create multiple scenarios and conflict resolution simulations. The graphical interface 600 is the visual and audible representation of the simulation to the player (user) 604. It may provide the user with visual and audible access to actions, feedback and information. The engine 601 is the hidden layer, a software program that serves as the brain of the platform that manages and controls the simulation. It contains a logic component and an artificial intelligence component that produce convincing actors and scenarios. An optionally separate component is the digital library 603. It may be separated from the code and may be connected to other sources of information online (over the Internet) or offline. It may contain textual descriptions 610, images 611, videos 612, and sound segments 613. Some or all of the items on the library are based on real-world events, and the library is updated on a periodic basis by the automatic delivery of additional real world content from a content source 620 such as an external news feed.

In order to create a new version of the simulation that deals with a new conflict, e.g., China-Taiwan, stored components such as graphic user interface (GUI) elements, real world video/photo/audio/news archives, and other data, may be changed. However, the separated structure enables easy and direct access so that in some embodiments, a core gaming platform may be used to simulate multiple conflicts. The graphical elements can be swapped to present the geography of the particular region, actions, variables and actors. The digital library can be filled in with new content that reflects the past and current situation of the particular conflict. The engine can be recoded to reflect the new core balance and new interrelations between the variables and actors. However, the core structure of the simulation and its method of operation stay the same.

In some embodiments, the platform is created to allow for online streaming updates or downloadable updates of content, graphics and code to reflect current events.

The Engine

Figure 7:
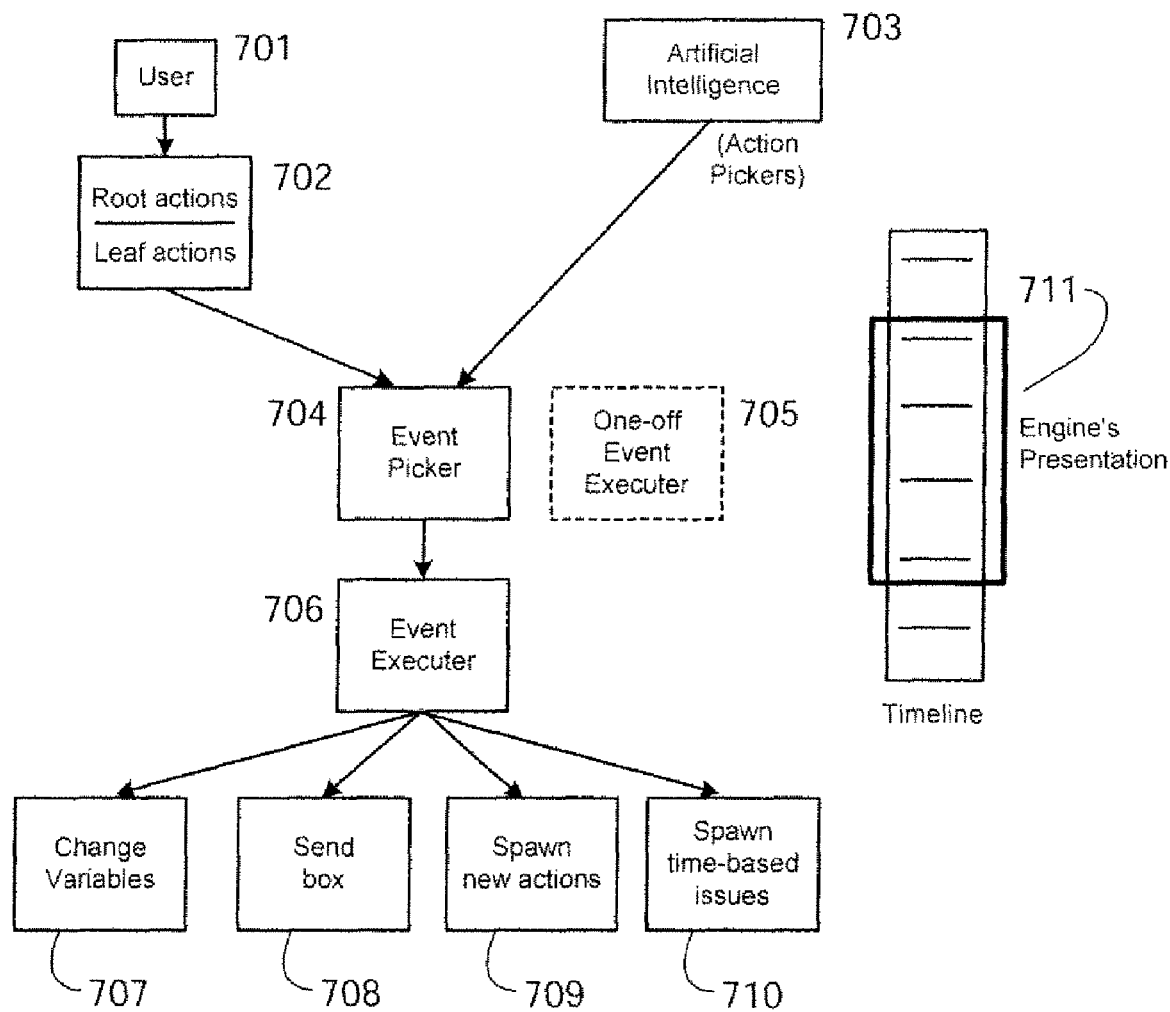
FIG. 7 is a block diagram of an exemplary simulation process.

FIG. 7 provides some more details regarding the procedure and operation performed by an exemplary simulation engine. In one embodiment, those are the components of the code and can be implemented in any programming language.

Each turn, the user 701 picks an action out of an offering of root actions and leaf actions. Leaf actions are sub-actions of root actions, such as: "release prisoners→release prisoners with no violent record" 702.

The input from the user goes into the event picker 704. The event picker is a module that selects an event to present to the player/user, and it also may gather a choice of action by an artificial intelligence component 703. The AI component 703 selects actions for a virtual or computer-generated player or scenario. The AI actions could he related to one or more of the AI actors. As an example, it might be: "take an anti-user action".

The event picker may be a core component of the engine, and in some embodiments it may responsible for all high-level and low-level calculations. Based on some selected conditions or all conditions, it picks the specific actions for the AI actors (such as: "anti-user action→small scale attack"), and picks events as a result of the user's actions. Then, it sends all information and instructions to the event executer 706, which is connected to both the graphical interface and to the digital library.

The event executer implements actions such as: presentation of events to the user 708, change of all variables in the engine and in the graphical interface 707, and the spawning of "new actions" 709 and time-based issues 710.

"New actions" are those actions, which are not included in the static selection presented to the user in the beginning of each turn. They are related to a specific event and are given to the user on a temporary basis. For example, if a small scale attack occurred, the user may be presented with new actions to respond to it, such as: "send police to investigate".

Time-based issues are also related to specific events those that have a long-term effect in the world. For example, if a small scale attack occurred, the effects stay in the world for several turns, with a different impact as time progresses.

The engine may introduce the ability to create a one-off event picker 705 for special cases. It provides the developers of the simulation with a "back door"—the opportunity to introduce events that are not necessarily generated by the AI actors or related to the certain conditions of the world, but are still sent to the queue of events. That one-off component may be useful in creating a "chain of events"—an event which automatically follows another event after a certain amount of time (several turns). The process may be transparent to the user, and the event may be presented to him as any other event. It also may be useful in integrating up to the moment current events.

The engine provides flexibility in managing time and turns 711. The engine may keep track of all turns, actions and events in the simulation from the very first turn. It also may keep track of future events and future effects of time-based issues. It may allow different ways to present this information to the user. It can be a complete record, or just a limited window of several turns.

The Graphical Interface

Figure 8:
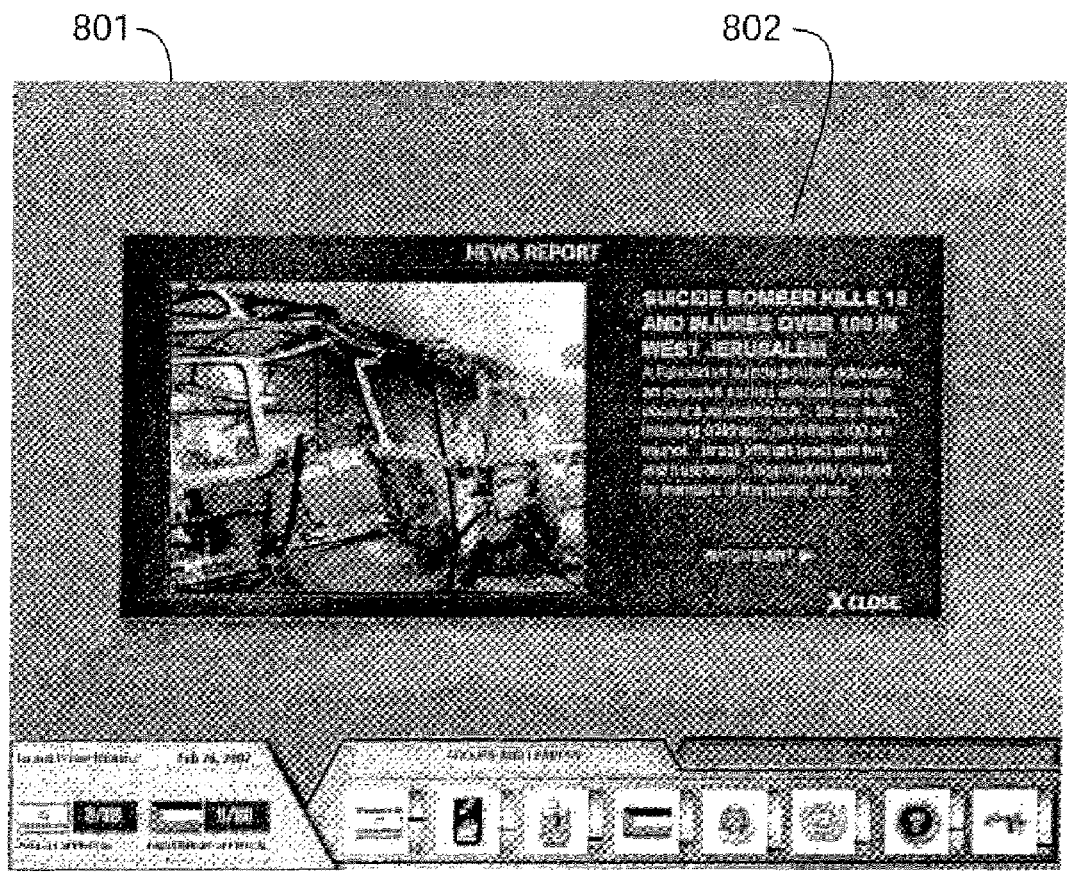
FIG. 8 is a screenshot of an exemplary GUI.

FIG. 8 presents one version of a graphical interface 801 of a conflict simulation, as designed for a specific case of the Israeli-Palestinian conflict. As stated above, all icons and graphical components may change when dealing with a different conflict. The platform also provides the ability to produce many variations of this basic layout and the rearrangement of this particular formation.

The user interface may include a high-resolution, optionally three-dimensional, map that may serve as an educational tool and provides information that relates to the geography of the conflict region. Clicking on areas of the map, cities or other significant locations opens up information boxes with description of the population, the role of that location in the conflict, its history and more. An icon or other graphic element may blink on the screen to present a location of an event on the map. Clicking on the icon may open up an information box illustrating the event.

The user interface is also shown in FIG. 4, where action bar 402 is a menu for the user to choose from. Some or all of the main root actions may opens up to a second menu with sub-actions (such as "political→make a speech" or "military→missile strike"). Rolling over some or all of these icons may present a textual description.

Clicking on any of those sub actions may open up an information box with additional sub actions (such as "political→make a speech→optimistic, demanding, assertive").

Inside the information box, an advisor option may be available in some embodiments with some clues as to the future consequences of a certain choice of action. Optionally, rolling over the sub-actions may change the images in the information box and the advisor's text associated with the specific sub-action.

In addition to the main root actions, there may be an "advance time" option 404. In some versions, the user may choose the amount of time to advance the simulation clock (such as: one day, one week, or one month). In other situations, a default timeframe, such as a day or week, may be used.

One part of the GUI may provide feedback to the user. It may also presents the score (or scores) 405 and some or all other variables 406. Some versions may present the AI actors and the variables on the same screen, while some show one or the other, and the user can toggle between them.

In order to present the conditional moods of the AI actors and other abstract variables, a graphical thermometer may be used in some embodiments. In this example, it moves from blue (positive) to red (negative). After each turn, an arrow may present the direction of the change.

Optionally, clicking on the score, actors or variables may open up information boxes with additional information. In the cases of actors and variables, the player may also find graphical representation of their progress over time.

In some versions of the invention, hot links to online informational sources may be embedded throughout the game to provide more in-depth information about the conflict. Those sources may be external to the simulation and represent third-party content.

Real-World News Events

FIG. 8 is a screenshot of one implementation of the presentation of real-world news events 802, whether as feedback to the user's actions or an independent action triggered by an AI actor. The information box may contain a headline and some body text that describe the event; a real photo and/or sound to enhance the emotional experience. An option to choose to watch a video segment may also be included.

In some cases, instead of presenting a real photo, 3D rendered images or animations are used. Those are specific cases, when a real-world image/video is not available, or when the designers choose not to use it. As an example, the designers might want to keep the simulation timeless and more generic and thus present a virtual figure, instead of a real-world leader.

The Digital Library

Figure 9:
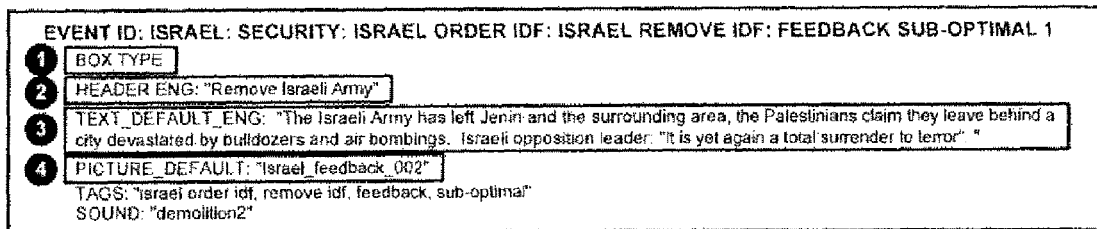
FIG. 9 depicts with screenshot an operation of a content management system and a digital library.
Figure 9:
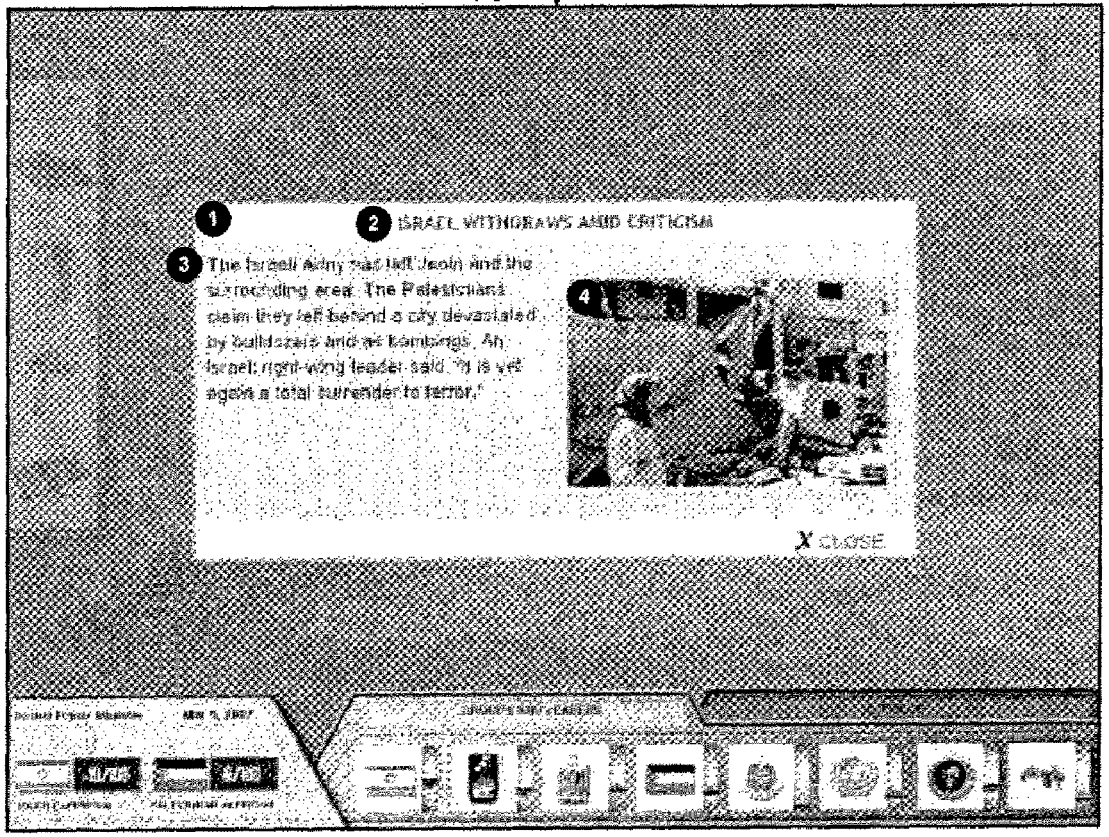

FIG. 9 illustrates a method of operation and integration of a content management system and a digital library. Those may be external to the core engine and to the graphical interface. They may be implemented as a database or any other form that enables the collection of digital data and allows for easy access and synchronization.

One way to store the information may be under an event ID 901. The event ID helps the content manager to keep track of and file events. The same event may contain multiple IDs, simply by changing the number at the end. The platform may then able to pick one of those randomly and create a richer scenario instead of sending repetitive responses to the user.

The tags are key words that are used by the engine to locate a specific event. The event executer uses those tags in order to communicate with the digital library and pull the needed information. Once the event is picked up, the platform uses the additional entries (box type, header, text, file names etc.) for the actual presentation.

The box type (1 in FIG. 9) may contain information for the graphical interface, on how to present the information box. If the entry is empty, the information box chosen may be the default one. In other cases, in order to differentiate certain events a different value may be entered (such as: "black"). The information box can be shaped and colored differently to emphasize characteristics (such as "extremely violent").

The digital library is designed in a way that enables the creation of different entries for different languages, in cases when the simulation is translated. The header (2 in FIG. 9) may contain information that may be presented as the header of the information box. The text (3 in FIG. 9) may contain the body text which describes the event. Both entries may be language-related.

Other entries may contain specific file names for images (4 in FIG. 9), videos and sound. Location entries may be used to spawn and event from a specific location on the 3-D map. The engine and the graphical interface components may use this information in order to locate files and present them to the user.

In some versions, some or all of the information contained in the digital library is streamed to the user online (such as over the Internet or via another communications network). In other versions, some or all of the information is contained in an installation file and when executed, is stored on the user's personal computer.

In some embodiments, the digital library may receive content updates from one or more real-time news sources such as television, wire, print, or Internet media sources (e.g., CNN, BBC, Reuters, New York Times, or other sources). The content updates may include text, video, photos and/or audio and may be streamed to the digital library via the Internet or another communications network. The content may be stored in the library and include (or be modified to include) tags, metadata, index files, or other information to allow the gaming platform to select new content for inclusion in appropriate portions of a game.

In an embodiment, a gaming platform includes at least three elements: (1) a rich graphical interface; over (2) an advanced logical and artificial intelligence (AI) engine; supported by (3) an external content database (digital library of text, images, video and sound). The technological architecture can be used to create simulations about current events. For example, the event may include any historical or current conflict, such as a conflict between nations, a conflict between tribes or ethnic groups, or any other conflict between distinct groups of people, e.g. the Israeli-Palestinian conflict, the U.S. vs. Islamic fundamentalism, or the Indian-Pakistani struggle over Kashmir. The digital assets that comprise the graphical interspace may be swapped easily, and changing the digital library of text, images and videos does not require a change in the code. When creating a new game fur a different conflict, different variables may be selected to create a plausible model for the conflict in question.

The simulation may be designed to put the player in a leadership position. The player must react to in-game events, such as negotiations or violent attacks, and interact with numerous other real and virtual players, such as political leaders and social groups, in order to win, such as by establishing a stable resolution to the conflict before his or her term in office ends. Other versions of the simulation may include multi-player and networked games (where human players take the roles of multiple leaders and social groups).

The player may control a certain number of role-based actions in various categories. Some of those categories may be (1) Security/Military, (2) Political, and (3) Construction (long-term and strategic actions). This actions list may be constructed specifically for each role in the simulation. Although aiming at a non-violent solution, the player may not automatically be penalized for committing violent actions. In some occasions a judicious use of violent actions might achieve an overall positive progress.

The simulation may help a player study foreign policy, consequences of actions, and learn how to improve relations. Numerous different actors (Groups and Leaders) are simulated to interact with the player based on conditional moods. Graphical presentation indicates to the player the level of satisfaction or disapproval of each of the actors with the player's policies at any given time. Unbalanced relations with different actors can lead very quickly to a losing state.

In addition to the AI actors/agents, the simulation manages a set of crucial abstract variables, such as security perception among the public, cooperation with the other sides or perception of the player's leadership. Some of those variables are interrelated to the AI actors, and some are independent.

The embodiments described herein introduce a turn-based game play. The player chooses actions and ends a turn. Then, virtual time passes and other real and/or virtual actors' actions and external events are simulated and presented. To enhance real-time feel and urgency, extreme events might be presented during a turn.

Events may be illustrated with real-life videos, sounds and pictures from the digital library. Relevant events are presented and marked on a high-resolution map of the conflict region (location-based events). Other events are time-based (they last several turns) and they are managed by the inner clock mechanism of the engine.

In some embodiments, the invention includes an online version or version that is played in connection with a communications network. The digital library is connected to a real-time news source (such as CNN, BBC or any other media organization) that feeds the simulation with ongoing news reports. That can be achieved through streaming the information to the player in real-time or through downloading updates to his personal computer. The news reports may be in form of text, video, and/or audio. The digital library may categorize and classify the news reports so that they may be used at appropriate points in game play.

The score provides immediate and direct feedback to the player on his success of failure in promoting the resolution of the conflict and non-violence in the region. It is a concise summary of all relevant abstract variables and the actors' relations with the player. The score system allows both positive and negative progress. In some embodiments, the player starts at 0 (zero) at the level of "Mediocre Leader". The maximum score may be, for example 100, "Nobel Prize Winner" level, and the minimum score may be, for example, −100, "War Criminal" level. The metrics are designed around tipping points that night improve or damage the player's efforts dramatically.

Some versions of the gaming platform described herein present a set of multiple scores. That separation enables a deeper understanding of certain variables and the core balance the player aims for. For example, one score could represent the internal authority/leadership of the leader the user plays, while the second could represent his external authority/leadership. In such cases, one score could advance positively while the other one advances negatively. That serves as a good indication for the user on where he should improve in order to reach stability and balance.

Figure 10:
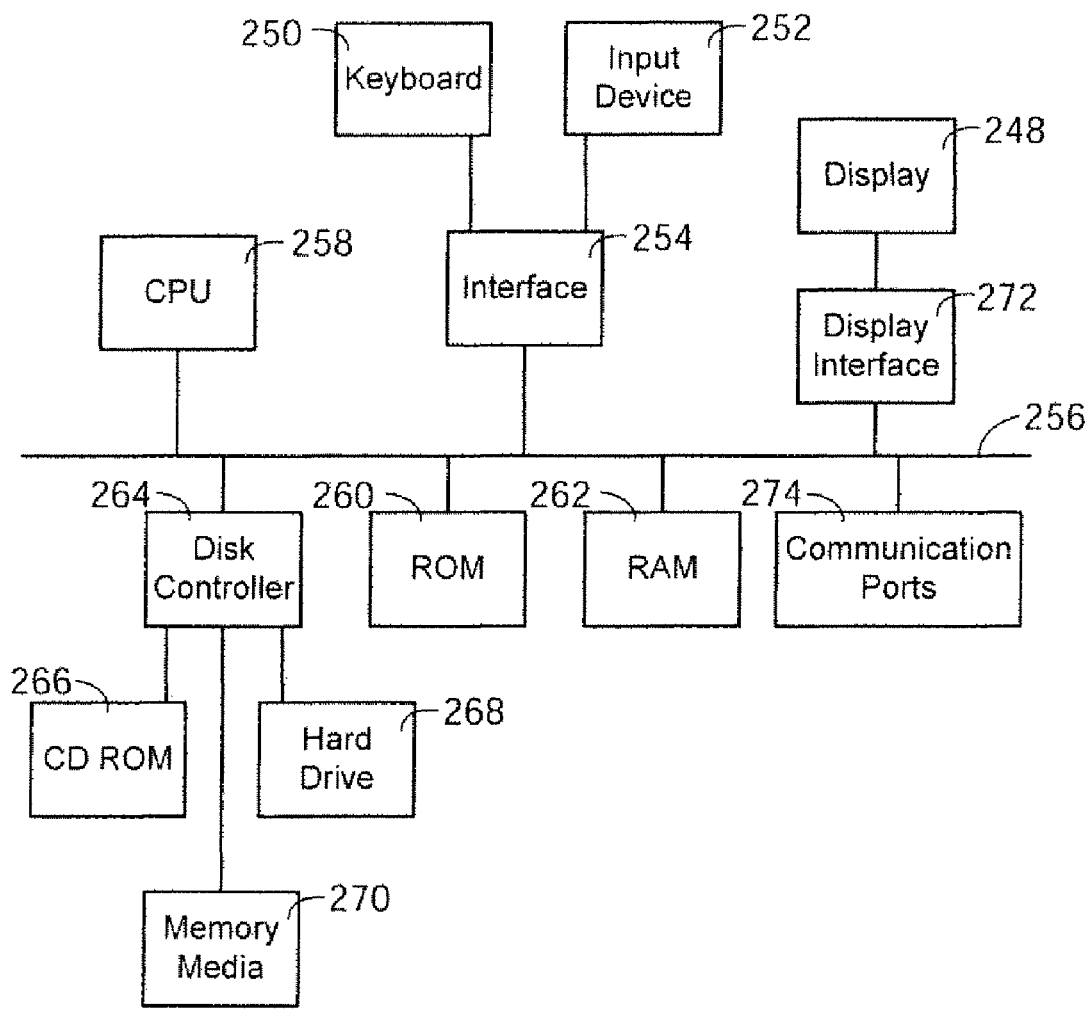
FIG. 10 is a block diagram of exemplary elements of a computing device.

FIG. 10 is a block diagram of exemplary hardware that may be used to contain and/or implement the program instructions of a system embodiment. Of course, any electronic device capable of carrying out instructions contained on a carrier such a memory, signal, or other device capable of holding or storing program instructions may be within the scope described herein. Referring to FIG. 10, a bus 256 serves as the main information highway interconnecting the other illustrated components of the hardware. CPU 258 is a central processing unit of the system, performing calculations and logic operations required to execute a program. Read only memory (ROM) 260 and random access memory (RAM) 262 constitute exemplary memory devices.

A disk controller 264 may interface with one or more optional disk drives to the system bus 256. These disk drives may be external or internal memory keys, zip drives, flash memory devices, thumb drives, or other memory media 210 such as, for example, CD ROM drives 266, or external or internal hard drives 268. As indicated previously, these various disk drives and disk controllers are optional devices.

Program instructions may be stored in the ROM 260 and/or the RAM 262. Optionally, program instructions may be stored on a computer readable medium such as a memory stick, a digital disk or another recording medium 270.

An optional display interface 272 may permit information from the bus 256 to be displayed on the display 248 in audio, graphic or alphanumeric format. Communication with external devices may optionally occur using various communication ports 274. An exemplary communication port 274 may be attached to a communications network, such as the Internet or an intranet.

In addition to the standard computer-type components, the hardware may also include an interface 254 which allows for receipt of data from an input device such as a keyboard 250 or other input device 252 such as a remote control, mouse pointer and/or joystick. A display including touch-screen capability may also be an input device 252. An exemplary touch-screen display is disclosed in U.S. Pat. No. 4,821,029 to Logan et al., which is incorporated herein by reference in its entirety.

An embedded system may optionally be used to perform one, some or all of the operations of the methods described. Likewise, a multiprocessor system may optionally be used to perform one, some or all of the methods described.

The gaming platforms described herein may provide an unbiased multi-layered gain simulation of real-world conflicts that engages the player in seeking non-violent solutions and compromise. Parents, gamers, professionals and teachers may benefit from the embodiments described herein as an engaging and new way to learn and discuss real-world events. The experience may educate users and future leaders by allowing them to explore the major powers in a conflict, experiment with "what if" scenarios and experience the events as seen from different perspectives/roles.

What has been described and illustrated herein includes various embodiments of the invention alone with some of their variations. The terms, descriptions, and figures used herein are set forth by way of illustration only and are not meant as limitations. Those skilled in the art will recognize that many variations are possible within the spirit and scope of the invention which is intended to be defined by the claims and their equivalents in which all terms are meant in their broadest reasonable sense unless otherwise indicated.

We claim:

1. A video game, comprising:
a graphic user interface that presents a user a simulation of real-life events wherein said real-life events include events arising from a conflict between two or more entities; a content database containing a collection of real-life news photos and videos; a simulation engine (1) presenting an inciting event which includes the display of a photo or video from the database and which serves as a trigger and entry point to educate the user about an environment and requiring the user to select a side or position in the conflict, with indicia of the inciting event being displayed on a map of a conflict region, followed by a plurality of possible actions to the user, said possible actions including at least one of military force, diplomacy, renegotiation or reconstruction; (2) receiving a selection of at least one of the actions from the user; (3) identifying, in the content database, at least one real-life news photo or video that is associated with the user selected action; and (4) presenting to the user a result in response to the selection wherein the result includes an identified photo or video; wherein (1) through (4) are repeated to present an additional plurality of possible actions, which possible actions require the user to participate in a decision-making process based on new conditions and feedback to previous user selections until a win or lose state is reached, wherein each of the additional plurality of possible actions are selected based on at least one previous result or user action;
a content update module that receives updated photo or video content from one or more content distributors; analyzes the updated photo or video for relevance; creates an association element for the updated content and an available action in the game based on the relevance; and includes the updated content and association element in the content database; and
a scoring module;
wherein the result of the game relates to both the selected action and the inciting event and includes a simulated event that illustrates a consequence of one or more user-selected actions.

2. The game of claim 1, wherein the receipt of updated content by the content update module occurs automatically from a subscription-based feed.

3. The game of claim 2, wherein the subscription-based feed comprises a real-world news source.

4. The game of claim 1, wherein the creation of an association element comprises: analyzing updated content; and associating a tag, metadata, or index file with the updated content update to allow the simulation engine to select updated content from the content database for inclusion in an appropriate portion of a game.

5. The game of claim 1, wherein a score is indicative of a compromise or conflict resolution associated with the result.

6. The game of claim 1, wherein the scoring module calculates a plurality of scores, wherein each score reflects different real or virtual player's reaction to the user-selected action.

* * * * *

UNITED STATES PATENT AND TRADEMARK OFFICE
CERTIFICATE OF CORRECTION

PATENT NO. : 8,277,315 B2  
APPLICATION NO. : 11/680937  
DATED : October 2, 2012  
INVENTOR(S) : Asi Burak et al.

Page 1 of 1

It is certified that error appears in the above-identified patent and that said Letters Patent is hereby corrected as shown below:

Title Page Item (57) Abstract, line 4, "a simulation engine that," should read --a simulation engine, that--;

In the Specification  
At column 1, line 32, "on" should read --own--;  
At column 2, lines 4-5, "a simulation engine that," should read --a simulation engine, that--;  
At column 2, line 44, "he" should read --be--;  
At column 2, line 66, "require" should read --requires--;  
At column 3, line 56, ";understood" should read --understood--;  
At column 4, line 10, "In" should read --in--;  
At column 5, line 11, "he" should read --be--;  
At column 5, line 25, "subscription-bases" should read --subscription-based--;  
At column 6, line 13, "pres" should read --press--;  
At column 6, line 52, "314," should read --314.--;  
At column 9, line 10, "he" should read --be--;  
At column 9, line 14, "may responsible" should read --may be responsible--;  
At column 11, line 34, "spawn and event" should read --spawn an event--;  
At column 12, line 4, "fur" should read --for--;  
At column 13, line 1, "The score" should read --The score header--;  
At column 13, line 2, "success of failure" should read --success or failure--;  
At column 13, line 12, "night" should read --might--; and  
At column 13, line 29, "such a" should read --such as a--.

Signed and Sealed this  
First Day of July, 2014

Michelle K. Lee  
*Deputy Director of the United States Patent and Trademark Office*